(12) United States Patent
Seitz et al.

(10) Patent No.: US 6,428,885 B1
(45) Date of Patent: Aug. 6, 2002

(54) SUBSTRATE BODY WITH A PROTECTIVE COATING

(75) Inventors: Katharina Seitz, Frankfurt; Stephan Süssbrich, Königstein; Michael Hornung, Frankfurt; Heinrich Kühn, Brechen; Frank Hiltmann, Kriftel, all of (DE)

(73) Assignee: Aventis Research & Technologies GmbH & Co KG (DE)

( * ) Notice: Subject to any disclaimer, the term of this patent is extended or adjusted under 35 U.S.C. 154(b) by 0 days.

(21) Appl. No.: 09/402,550

(22) PCT Filed: Mar. 24, 1998

(86) PCT No.: PCT/EP98/01730

§ 371 (c)(1),
(2), (4) Date: Dec. 6, 1999

(87) PCT Pub. No.: WO98/45498

PCT Pub. Date: Oct. 15, 1998

(30) Foreign Application Priority Data

Apr. 8, 1997 (DE) .......................................... 197 14 432

(51) Int. Cl.$^7$ ................................................ C23C 24/10
(52) U.S. Cl. .................... 428/325; 428/212; 428/304.4; 428/318.4; 428/408; 428/698; 428/704
(58) Field of Search ................................. 428/704, 408, 428/325, 323, 304.4, 318.4, 212, 698

(56) References Cited

U.S. PATENT DOCUMENTS

| | | | | |
|---|---|---|---|---|
| 4,040,870 A | * | 8/1977 | Holzl | 148/6.3 |
| 4,308,115 A | * | 12/1981 | Foster, Jr. et al. | 204/67 |
| 4,352,918 A | * | 10/1982 | Boxall et al. | 204/286 |
| 4,500,643 A | | 2/1985 | Gesing et al. | 501/96 |
| 4,820,392 A | * | 4/1989 | Moskowitz et al. | 204/192.11 |
| 5,378,327 A | * | 1/1995 | Sekhar et al. | 204/67 |

FOREIGN PATENT DOCUMENTS

| | | |
|---|---|---|
| JP | 02004952 | 1/1990 |
| JP | 02043352 | 2/1990 |
| JP | 04103751 | 4/1992 |

OTHER PUBLICATIONS

Riviere et al "Crystalline TiB Coating Prepared by Ion–Beam–Assisted Depsition" Thin Solid Film (1991).*

* cited by examiner

*Primary Examiner*—Archene Turner
(74) *Attorney, Agent, or Firm*—Connolly Bove Lodge & Hutz LLP

(57) ABSTRACT

The invention relates to a support body with a coating of at least 95% by weight titanium boride, said coating having an oxygen content of less than or equal to 1% by weight, a metallic impurities content of less than or equal to 0.5% by weight, and a specific electrical resistance of less than or equal to 10 $\mu\Omega\cdot m$ at room temperature.

12 Claims, No Drawings

SUBSTRATE BODY WITH A PROTECTIVE COATING

The present invention relates to a support body having a coating comprising at least 95% by weight titanium boride wherein said coating has an oxygen content of less than or equal to 1% by weight, a metallic impurities content of less than or equal to 0.5% by weight and a specific electrical resistance of less than or equal to 10 $\mu\Omega\cdot m$ at room temperature.

It is known that coatings on a support body often serve to increase the life of the support body in a certain application, to improve the properties for a certain application, and/or to open up new fields of use for the support material. A coating allows the possibilities for use of the support body to be improved and its resistance to be increased.

Special requirements are made of this coating. It is known that in the case of components which are employed in various technical fields, different types of stress may arise, often in combination. For use in metal melts and/or salt melts, for example, high corrosion resistance and erosion resistance are necessary. Furthermore, it is necessary to ensure good adhesion to the component and good cohesion within the coating system. In addition, the protective coatings must have low internal compressive stresses, and high hardness and load-bearing properties. In certain applications of the components, furthermore, low specific electrical resistance of the protective coating must be ensured.

DE-A-35 13 882 discloses a protective coat which consists of an adhesion layer applied to the support, an interlayer applied to the adhesion layer, and a top layer applied to the interlayer. The adhesion layer corresponds in its composition essentially to the support material, so that there is not too great a difference in the thermal expansion coefficient. The interlayer is a mixture of the materials of the adhesion layer and of the top layer. The top layer can be, inter alia, titanium diboride. This protective coat is intended to protect the support material against corrosion, oxidation, abrasion, erosion, chemical attack and radiation, insulate it electrically at the same time, and, by virtue of heat insulation, to protect it in the short term against overheating.

A coat for protection against high-temperature corrosion is described in GB-A-1 104 840 for a metallic body comprising refractory metal such as, for example, tantalum, tungsten or molybdenum. The coat consists of a mixture of from 85 to 99% by weight zirconium boride/titanium boride and from 1 to 15% by weight silicon. When the materials were selected it was taken into account that the thermal expansion coefficients of substrate and coat must be comparable.

In U.S. Pat. No. 5,368,938, protection against oxidation is achieved by specially pretreating the surface of the carbon body, applying an interlayer to this pretreated surface and then applying a top layer. The pretreatment of the carbon body consists in etching the surface and then reacting the resultant porous surface layer with boron oxide. This produces a boron carbide layer having a porosity of about 50%. The porosity of this base layer enables the glass-forming interlayer applied over it to form a connection with the base body. Then a top layer comprising refractory materials is applied to this base layer. The layers are applied by way of CVD. The complicated treatment of the substrate and the application of interlayers serve to seal cracks which occur in the outer top layer.

This aim is also pursued in U.S. Pat. No. 5,536,574, in accordance with which the protection against oxidation of a carbon substrate is intended to be achieved by way of a boron-containing SiC interlayer and a top layer of glass ceramic consisting of $TiB_2$, colloidal $SiO_2$ and SiC. The layers are applied by applying the various materials in paste form in succession and then sintering them.

As protection against corrosion by liquid aluminum, DE-A-23 05 281 describes a coating or a covering of melted or highly sintered, dense, refractory hard material on a cathode or a cathode element made of carbon. The hard material referred to comprises the borides, nitrides, carbides and silicides of transition metals of groups four to six of the Periodic Table. Present in addition to the hard material is a small proportion of carbon, which forms a binary system. This melt coating can be obtained either by heating at temperatures from 2200 to 2300° C. or by plasma spraying.

Furthermore, DE-A-12 51 962 discloses a cathode or a carbon cathode with a coating that consists of a mixture of a hard material such as titanium boride or titanium carbide and at least 5% carbon. This cathode is calcined at temperatures of preferably from 1600 to 2000° C.

The prior art described above shows by way of example the problems of applying a coherent, jointless coating, preferably of titanium boride, to a support body with good adhesion when the coating and the support body have different thermal expansion coefficients. The approach described in GB-A-1 104 840, namely to use only materials having a similar expansion coefficient, in practice entails too great a restriction in the selection of material. In many cases, interlayers are applied in order to harmonize the different thermal expansion coefficients of coating and support body, the material of said interlayers having to be selected such that there is gradual adaptation of the expansion coefficients between support body and top layer. One disadvantage of this procedure is a complex coating, which becomes relatively expensive and also requires the presence of suitable materials having the correct thermal expansion coefficients.

In order to seal the support material effectively against the external medium, the coating must be so impermeable that it has no open pore channels which connect the support body with the environment outside the coating. This means that the coating must have a sufficiently low porosity and a certain thickness. Pure titanium diboride, as a high-melting material ($T_m$ at approximately 2900° C.) compacts very poorly on sintering. In order to obtain compaction at more readily achievable temperatures, additives are frequently added in order to reduce the sintering temperature. Titanium diboride and carbon, for example, form a binary eutectic for which the eutectic temperature for the composition 85% $TiB_2$ and 15% C is about 2287° C. The addition of the low-melting silicon, which lowers the sintering temperature by more than 1000° C., must be seen from the same standpoint. The addition of other metals and alloys, such as Fe, Ni, Cr and Mo, for example, produces the same effect. Likewise, with oxygen, a very low-melting boron-containing phase (glass phase) is formed. The addition of additives is advantageous for the greater ease of compaction of the titanium diboride; however, the formation of low-melting secondary phases is accompanied to the same extent by a reduction in the high-temperature resistance of the material. A further disadvantage of adding additives is the change in a number of material properties of the sintered body, such as, for example, the specific electrical resistance. An oxygen content of a few percent by weight leads to an increase in the specific electrical resistance by a factor of from 100 to 1000. The oxygen content of the coating is preferably less than 0.6, in particular less than 0.3, % by weight.

The formation of vitreous or glass-ceramic interlayers allows for compensation of the stresses which occur on heating owing to the different thermal expansion coefficients, since these amorphous layers are relatively flexible. However, even these glass-ceramic layers have the disadvantage that their high-temperature stability is low.

The majority of the coatings known to date exhibit poor adhesion to the support body, especially at relatively high temperatures such as, for example, at 900° C. if heating and cooling are conducted in alternating cycles. In many cases cracks are formed, and the coating begins to become detached. Some coating compositions, and their production methods, are highly complex and therefore of no economic interest.

The object of the invention was to provide a support body having a jointless coating principally comprising titanium boride which is able to protect the support body effectively at high temperatures both against corrosion by liquid metals, e.g., against the penetration of aluminum and/or sodium from melts comprising aluminum and/or sodium and/or compounds thereof and against erosion, said coating having a high level of adhesion to the support body, especially to a support body comprising carbon and/or graphite, and being electrically at least as conductive as the support material. For a particular application, the coating should be able to withstand the melt of an aluminum fusion electrolysis cell under operating conditions for at least one year.

This object is achieved with a support body which carries a coating comprising at least 95% by weight titanium boride, wherein said coating has an oxygen content of less than or equal to 1% by weight, a metallic impurities content of less than or equal to 0.5% by weight, and a specific electrical resistance of less than or equal to 10 $\mu\Omega \cdot m$ at room temperature.

Titanium boride is a material suitable in principle for coatings of support bodies which are intended to be protected against chemical corrosion by metal melts at high temperatures and against erosion. Owing to the aggressive nature of metal melts at high operating temperatures, the titanium boride should preferably be of high purity and should be virtually free from oxide phases and soluble metallic impurities, since these can be leached out of the metal melt, as a result of which the microstructure becomes unstable because of grains escaping. The properties of the coating, in accordance with the invention, can be best achieved by preparing the coating by means of plasma spraying. However, in the case of reactive spray powders, such as $TiB_2$, for example, there is a change in the chemical composition of the spray coating prepared from them. Atmospheric oxygen can diffuse into the plasma flame and lead to oxidation of the reactive spray powder and, consequently, to altered properties of the coating as well, such as chemical stability and electrical resistance, for example. Therefore, the coating of the invention is applied in a substantially or totally oxygen-free atmosphere. The metallic impurities are preferably ≦0.35% by weight, with particular preference ≦0.2% by weight and, in particular, ≦0.12% by weight. In the process of the invention, no metallic powder is added to the spray powder.

At an oxygen content of less than or equal to 1% by weight, the specific electrical resistance of the coating is generally less than or equal to 10 $\mu\Omega \cdot m$ at room temperature, preferably less than ≦5 $\mu\Omega \cdot m$. For the coating of the invention it is important to select an appropriate spray powder particle size distribution. Excessively large spray powder particles produce a highly porous coating having a relatively high specific electrical resistance. The smaller the particles, the lower the specific electrical resistance. However, this is true only down to a certain limit. The specific electrical resistance of $TiB_2$ single crystals lies between 0.066 and 0.09 $\mu\Omega \cdot m$ and thus below this limit. If the particle size is reduced further, the resistance increases again. This increase in resistance is caused by the higher proportion of oxygen in finer powders.

Similarly, it can be important that when the coating is applied to the support body surface there is no reaction of the support body material with titanium boride. The interlayer forming as a result of such a reaction could be soluble in the metal melts or could have a distinctly higher specific electrical resistance, acting as an electrical barrier layer.

Where the titanium boride coating and the support body have markedly different thermal expansion coefficients, this can readily lead to flaking of the coating under thermal loads, for example, at temperatures of up to 950° C., if the coating is completely impermeable. Since the application of a plurality of individual layers having different properties atop one another, in order to gradually adapt the thermal expansion coefficients of the support body to those of the coating, is uneconomic, an advantageous titanium boride coating is one having a porosity of preferably not more than 10% by volume, in particular from 4 to 7% by volume, and having a specific microstructure which permits compensation of the mechanical stresses in the coating: the coating preferably has a microstructure which in the form of a transverse ground section (ground section vertically through the coating for observation under the direct-light microscope or scanning electron microscope) shows a lamellar microstructure having an average ratio of lamella length to lamella height in the transverse ground section in the range from 1.5:1 to 10:1; the individual lamellae represent cross-sections through the spray spots which are formed when the individual melted spray powder particles impinge and which become easily visible by etching with boiling 30% strength hydrofluoric acid for about 5 minutes. In the case of the coating of the invention it is advantageous if the extent of melting of the $TiB_2$ particles is substantially or totally complete. This is advisable since without low-melting phases, e.g. metallic or oxide-like binder phases, solidification of the coating is difficult. The extent of adhesion of the jointless titanium boride coating of the invention to the support body of carbon and/or graphite is such that if the coating is stressed, for example, by impact or jolting, any crack which forms, insofar as it extends essentially parallel to the coating surface, does not run right across the coating and does not run through the interface between coating and support body, but instead runs within the support body. The uniformity of the microstructure is ensured by the uniformity of the spray powder and of the process conditions. Similarly, the measurement of the tensile adhesive strength in accordance with DIN 50160 showed that the tensile samples failed almost exclusively within the support body of carbon and/or graphite.

The coating of the support body takes place advantageously under operating parameters of the plasma burner, with a coating-chamber pressure level and with an appropriate spray powder particle size, such that a porosity of not more than 10% by volume, in particular from 4 to 7% by volume, is produced. The porosity and the thickness of the coating are advantageously within a range in which the coating exhibits no pore channels that connect the support body with the environment outside the coating. The thickness of the titanium diboride coat is preferably from 0.1 to 1 mm, although in principle it is possible to produce thicker coats. Within this thickness range, the risk of flaking on exposure to very severe fluctuations in temperature is particularly low. The impermeability of a jointless coating having a coat thickness of from 0.1 to 1 mm, which for the high-melting titanium diboride with a melting point of more than 2900° C. can be achieved preferably by means of a controlled inert gas plasma spraying process, is a prerequisite for the coating to withstand the operating conditions in an aluminum fusion electrolysis cell for more than a year. Coherent jointless coatings are preferable for corrosive loads.

The functional capacity of the coating applied to the surface of carbon and/or graphite bodies is determined above all, inter alia, by the adhesive strength of the coating. The adhesion of the coating of the invention to a support body of carbon and/or graphite, especially graphitized carbon, is high: the adhesive strength of the coating is higher than the strength of the material of the support body. The outstanding adhesion is achieved by applying melted powder particles under reduced pressure and at high speeds, which result in mechanical anchoring to the surface. It is advantageous to apply the coating directly, without an interlayer, to the slightly roughened surface of the carbon bodies, as is present in the case of normal machining by means, for example, of milling or cutting. For coating, the support bodies must be clean and dry.

When the support body of carbon and/or graphite is employed in an electrolyte melt and/or metal melt, as little as possible of the metal and electrolyte melt should be able to penetrate it. The sodium formed as a result of a side reaction in the fusion electrolysis of aluminum forms, together with graphite or carbon, intercalation compounds which can lead to an increase in volume. The ex ion caused by the increase in volume results in bowing and bulging of the carbon cathode elements in the aluminum fusion electrolysis cell. The expansion of the carbon material as a result of the penetration of sodium into carbon is determined using the so-called Rapoport test.

The mechanical erosion resistance of a coating can be determined using a method adapted specifically to the in-use wear conditions: carbon, and especially graphitized carbon, since it is relatively soft, is abraded by undissolved aluminum oxide, which in the course of the operating period collects on the surface of the carbon cathode elements at the bottom of the aluminum fusion electrolysis cell. Uncoated cathode elements exhibit erosion of approximately from 5 to 10 mm per annum. This stress can be simulated by measuring the erosion resistance in accordance with the method of Liao et al. (X. Liao, H. Oye, Carbon, Vol. 34(5), 1996, 649–661). In accordance with Liao et al., the coating of the invention should exhibit little or no erosion in the course of a six-hour test in an $Al_2O_3$ slip, so that a coated sample exhibits an attrition ratio of not more than 1:2 in comparison to an uncoated sample.

In the titanium boride coating it is possible for preferably up to 5% by weight of borides, carbides, nitrides and/or silicides of the composition $M_xB_y$ to be present, $M_x$ representing levels of the transition metals of groups 4, 5 and/or 6 of the Periodic Table, or representing aluminum, and $B_y$ representing the boride, carbide, nitride and/or silicide content. Particular preference is given to zirconium boride and aluminum boride. Preferred levels are from 1 to 2% by weight.

The coating of the invention for support bodies of whatever shape is particularly advantageous for the coating of carbon and/or graphite bodies of large surface area which are used as electrodes for the fusion electrolysis of aluminum. In the case of such cathode elements, usually only one face of the element is coated, that facing the anode, with the possible addition of a marginal region beyond the edges of this coated face. The coating can be applied both to bodies of fired, nongraphitized carbon—that is, bodies which in the course of their production have been heated to a temperature of at least 750° C. and to not more than 1400° C.—and to bodies of electrographite—that is, bodies which in the course of their production have been heated a temperature of at least 1600° C., preferably to temperatures of from 2400 to 3000° C. The coating of the invention can also be applied to support bodies of steel, other metals or alloys, refractory metals, composite materials, or ceramics. For many applications it is important that the surface of a support body is protected against attack from chemically aggressive media at high temperatures, against abrasion, erosion and/or oxidation.

Support bodies coated in accordance with the invention can be employed as electrodes, especially as cathode elements in the fusion electrolysis of aluminum, as heating elements, inter alia, for electrically heated ovens, as refractory linings, as wear-resistant elements, or as vessels, especially as crucibles, as elements in heat exchangers or nuclear reactors, as nozzles, evaporator boats and heat shields.

EXAMPLES

Example 1

Producing the Coating

The coating of the invention was produced on support bodies of carbon or graphite of the types "5BDN", "5BGN" and "BN" from the manufacturer SGL CARBON AG by means of plasma spraying in an inert atmosphere under slightly reduced pressure. For coating, the support body was introduced into a vacuum-coating chamber. The plasma burner was a specially produced version from Medicoat AG with a burner output of 50 kW, with a nozzle geometry developed especially for the preferred spray powders and process conditions, and with an increased cooling output. It could be moved in x, y, z direction. The chamber was evacuated first to a residual pressure of about $10^{-2}$ mbar and was then flooded with argon to the desired operating pressure, preferably in the range from 700 to 950 mbar. Following the ignition of the plasma burner, the arc voltage was held at from 60 to 78 V. A spray powder comprising at least 95% by weight $TiB_2$ and having an average particle size in the range from 10 to 55 µm, preferably in the range from 20 to 30 µm, was introduced into the plasma flame. The spray powder could be a homogeneous mixture of different powder grades. The spray powder and the spraying conditions were chosen such that the coating had an oxygen content of less than or equal to 1% by weight. If appropriate, the spray powder to be chosen had to have, correspondingly, a certain carbon content in order to reduce an elevated oxygen content in the course of the spraying procedure. The melted powder particles were deposited on the support-body surface, which was at a distance of about 60 to 100 mm from the plasma nozzle. With an output of from 45 to 60 kW and a plasma gas flow of about 55 l/min the powder throughput was at least 30 g of powder per minute. The spray powder was blown into the flame with the aid of argon as carrier gas. The plasma burner scanned the surface in lines. The rate of movement and the distance between the individual lines were set such that the desired coat thickness was achieved preferably in one pass and not more than two passes. Total coat thicknesses of preferably from 0.1 mm to 1 mm were applied. In the course of coating, the temperature of the support body could be between 100 and 400° C.

Rapoport Test

In the fusion electrolysis of aluminum, in practical operation, a carbon cathode is subjected to severe chemical corrosive and erosive loading. To determine the corrosion effect of melts in aluminum fusion electrolysis cells on various titanium boride coatings, tests were carried out on coated Rapoport test samples. The Rapoport test was carried out using a so-called Rapoport test apparatus from the manufacturer R & D Carbon Ltd., Sierre, Switzerland, and the test was run in accordance with the operating instructions. The samples of material to be tested, in the form of cylinders made from the grades "5BDN", "5BGN" and "BN", were produced by drilling and subsequent surface machining and were coated all over. The coating was applied with a thickness of about 0.3 µm and—as far as the samples of Table I are concerned, with an average porosity of about 6% by volume to sample bodies of the type "5BDN", "5BGN" and "BN". A graphite crucible was filled with a coated sample and an electrolysis bath mixture and was placed in the oven. The graphite crucible was connected as anode. The sample was pressed with a hydraulic pressure of 5 MPa against a heat-resistant steel rod which formed the cathode. The samples were preheated at working temperature for four hours and then electrolyzed at 980° C. for 2 hours with an argon flow rate of 100 l/h. The composition of the bath mixture used in this test was as follows: 71.5% by weight $Na_3AlF_6$; 5.0% by weight $CaF_2$; 14.5% by weight NaF; 9.0% by weight $Al_2O_3$. The particle sizes of the bath mixture prior to melting were less than 4 mm; the bath weight was 765 g.

Sample size: Cylinders of diameter 30 mm+/−0.1 mm and length 100 mm+/−0.2 mm. Diameter of the graphite crucible: 90 mm; height: 90 mm; immersed sample length: 60 mm. Current density: 0.7 A/cm². Working temperature: 980° C.+/−2° C. Pipe oven: 160 mm diameter, 400 mm active length. The expansion change during the electrolysis was calculated as follows:

$$\text{Expansion} = \frac{\Delta L_{max} \text{ (mm)}}{60 \text{ (mm)}} \times 100 \; (\%)$$

In the Rapoport test, the support bodies coated in accordance with the invention showed no, or virtually no (<0.2%), linear expansion change. Uncoated support bodies made of the material of type "5BDN" gave an average expansion change of from 0.5 to 0.6% in the Rapoport test. From this it was concluded that the coatings of the invention did not have any continuous pores and constituted an effective protection against the penetration of sodium.

the confines of measurement accuracy. In comparison to the uncoated carbon bodies, the erosion resistance went up at least twofold ("5BDN") or by eight times ("BN").

Determining the Specific Electrical Resistance

The specific electrical resistance of thin coatings cannot be determined precisely or easily. In these experiments, a measurement apparatus constructed in house was used. The electrical resistance of the coating was measured by passing a direct current of 10 A through the sample and measuring the voltage drop over a length of 40 mm by means of a potentiometer. The mean of four individual measurements was taken and the specific electrical resistance calculated. The electrical resistance of each support body was determined before and after coating. In this measurement method, the resistance of the support body material has an effect on the measured value for the electrical resistance of the coating and cannot be corrected. In the case of all the support bodies of carbon and/or graphite, the coated samples gave a specific electrical resistance which was lower by from 5 to 50% than that of the uncoated samples.

An Overview of the Experimental Results

TABLE I

Effect of the oxygen content of the titanium boride coating on the specific electrical resistance and the corrosion stability in the case of support bodies, based on the type "BN" by way of example

| Experiment | 1 | 2 | 3 | 4 | 5 | 6 | 7 |
|---|---|---|---|---|---|---|---|
| Oxygen content (% by wt.) | <0.1 | 0.2 | 0.4 | 0.5 | 0.6 | 0.8 | 1.0 |
| Specific electrical resistance ($\mu\Omega \cdot m$) | <0.2 | <0.2 | 2 | 4 | 6 | 7 | 9 |
| Corrosion effect* | none | none | barely noticeable | slight | markedly penetrating | considerable corrosion | severe corrosion |

*change of the coating on samples from the Rapoport test: attack at grain boundaries by the aluminum melt.

Determining the Erosion Resistance

The slip used for determining the erosion resistance in accordance with Liao et. al. was prepared as follows: 950 ml of "heavy liquid" with a density of 2.65–2.70 g/cm³, consisting of distilled water and sodium polytungstate $Na_6H_2W_{12}O_4$, was stirred for 15 minutes with the addition of 1282.5 g of $Al_2O_3$. The $Al_2O_3$ in question was so-called primary $Al_2O_3$ having a density of 3.58 g/cm³, an $\alpha$-$Al_2O_3$ content of 18% and a specific surface area of 59 m²/g. The particle size distribution was as follows: >180 μm: 0.2% by weight; 180–125 μm: 8.3% by weight; 125–90 μm: 38.5% by weight; 90–63 μm: 40.2% by weight; 63–45 μm: 7.9% by weight; <45 μm: 4.9% by weight. The sample bodies were rods with a length of 60 mm and a diameter of 10 mm. The samples, which were coated all over, dipped 42 mm into the slip. The samples were rotated in the slip at a rate of 1.5 m/sec. After half of the test time had elapsed, the samples were turned by 180° C. so that the front and back faces were stressed appropriately. The overall test period was 6 hours per sample. The erosion was determined by way of a buoyancy measurement. In measuring the erosion resistance it is usual to state the abrasion of the tested material in comparison to a standard material or in a relative comparison among the samples measured. The sequence of the uncoated carbon bodies, based on the erosion resistance measurements, was:

5BDN>>5BGN>BN.

The erosion resistance of the coated support bodies of the three support materials was approximately the same within Table I indicates that the oxygen content of the titanium boride coating for use in an aluminum fusion electrolysis cell should be very low, preferably <0.2% by weight. For other applications where there is no corrosive stress, the oxygen content can be much higher than 0.2% by weight.

TABLE II

Effect of microstructure and porosity of the titanium boride coating on the erosion stability, adhesion and linear thermal expansion behavior on support bodies, based on the type "5BDN" by way of example

| Experiment | 1 | 2 | 3 | 4 | 5 | 6 |
|---|---|---|---|---|---|---|
| Ratio of lamella length to lamella height | 1:1 | 1.5:1 | 4:1 | 8:1 | 10:1 | 12:1 |
| Porosity (% by vol) | 13 | 10 | 7 | 4 | 5.5 | 9 |
| Attrition ratio coated to uncoated+ | 1:1.2 | 1:2 | 1:4 | 1:8 | 1:3 | 1:1.5 |
| Adhesion | poor, flaking | sat. | sat. | sat. | sat. | sat. |
| Expansion (%)* | 0.45 | 0.15 | <0.1 | <0.1 | <0.1 | 0.2 | sat. = satisfactory
+erosion test
*results of the Rapoport test

By means of a carbon cathode element having a coating of the invention which at an oxygen content <0.2% by weight consisted essentially of 99.8% by weight titanium boride and had a porosity of from 4 to 7% by volume and a coat thickness of from 0.3 mm to 0.5 mm, the corrosive and erosive attack was greatly reduced. As a result, owing to the high electrical conductivity (specific electrical resistance of less than 1 $\mu\Omega\cdot$m) and the wettability by liquid aluminum metal, it was possible to save energy in the production of aluminum, by reducing the cell voltage. The lamellar microstructure of the coating of the invention resulted in good adhesion and a reduction of mechanical stresses in the coating. When the support body was used as a cathode element in a metal melt for the electrolytic preparation of aluminum, this coating was resistant to said metal melt for more than a year.

Example 2

The use of graphite as a material for industrial ovens has hitherto been restricted, owing to the oxidation of these materials, to inert-gas and vacuum units. However, under the conditions of these units, there are also various interactions between atmosphere and graphite. One of the domains of the graphite materials is the field of high-temperature engineering with working temperatures above 1800° C., for example, for the production of technical ceramics.

A graphite heating element which had been provided in accordance with Example 1 with a titanium boride coating was used for sintering sensitive high-performance ceramics, such as AlN, inter alia. Screening of the carbon-containing oven atmosphere of the oven area heated by graphite elements against the material being sintered was necessary, since carbon has a certain solubility in the ceramic. The requirements on the coating in this case were a coating having a porosity $\leq$5% by volume and having a very good adhesion, which can be employed even with frequent temperature changes and at temperatures of up to 2200° C. in nitrogen or vacuum. Since the heating element was directly heated electrically, it was logical to select a coating having good electrical conductivity. Thanks to the heating elements coated with essentially titanium boride the sintering crucibles into which the material to be sintered would otherwise have to be placed for shielding from the oven atmosphere could be dispensed with. In addition to the fact that expensive sintering crucibles were no longer necessary, it was also possible to utilize the existing oven space much more effectively. Since no excess material had to be heated as well, great energy savings were achieved in sintering. The use of electrically heated ovens of this type offered the possibility of carrying out energy input with high precision without affecting the oven atmosphere.

Through the use of coated heating elements in ovens as are used for in situ investigations of sintering processes (R. Hofmann et. al.: Neuentwicklung einer Thermooptischen MeBanlage zur in-situ Untersuchung von Sintervorgängen [Development of a new thermooptical measurement unit for in situ investigation of sintering processes], Tagungsband zur Werkstoffwoche 1996, Stuttgart 1996), investigations were made possible by optical measurement methods on sintering samples which would otherwise react with the carbon-containing oven atmosphere.

Example 3

A titanium boride coating is further suitable for components which are in contact with melts. The coating of the invention containing 99% by weight titanium boride, produced in accordance with Example 1, was highly resistant to melts of Al, Cu, Mg, Sn, Bi, Zn and Pb. As a consequence, the service life of metallurgical crucibles coated essentially with titanium boride and employed for such melts was much longer.

Example 4

Coatings produced by PVD (physical vapor deposition) can be used in particular in optics, optoelectronics and electronics, for decoration (beautification), and for protection against wear. Evaporator boats or crucibles are required for this in order to prepare the molten metal. Since the melt is in contact with the vessel for a relatively long time, it is necessary to use a chemically inert, thermally stable material which is resistant to high vacuum and has good thermal conduction and great resistance to temperature change. For evaporator boats and crucibles, which are normally fabricated from a composite material comprising titanium boride, boron nitride and/or aluminum nitride or from a composite material comprising boron nitride together with tungsten and molybdenum and/or chromium, graphite can be employed as a support body with a coating essentially comprising titanium boride. For vapor deposition of thin coatings by means of PVD, the coat material, with a titanium boride content of 96% by weight, was heated in a crucible under a high vacuum until it evaporated and deposited on the comparatively cold substrate. The crucible was heated by direct passage of current. The bodies of the invention proved just as appropriate in this function as the far more expensive composite-material components produced laboriously from solid material. An essential advantage of coated vessels over uncoated vessels of solid material is that it is possible, simply, to utilize a greater variety of shape and size if it is possible to use an easily produced and machined base-body material.

What is claimed is:

1. A support body with a coating comprising at least 95% by weight titanium boride, wherein said coating has an oxygen content of less than or equal to 1% by weight, a metallic impurities content of less than or equal to 0.5% by weight, and a specific electrical resistance of less than or equal to 10 $\mu\Omega$.m room temperature, and wherein the thickness of the coating is at least 0.1 mm.

2. The support body as claimed in claim 1, wherein the coating has a lamellar microstructure with an average ratio of lamella length to lamella height in the transverse ground section in the range from 1.5:1 to 10:1.

3. The support body as claimed in claim 1, wherein the coating has a porosity of from 4 to 7% by volume.

4. The support body as claimed in claim 1, wherein the coating has no pore channels which connect the support body with the environment outside the coating.

5. The support body as claimed in claim 1, wherein when the support body is connected as cathode element in a salt melt for the electrolytic production of aluminum the coating is resistant to said salt melt for at least a year.

6. The support body as claimed in claim 1, wherein the coating has a high level of adhesion to support bodies of carbon and/or graphite.

7. The support body as claimed in claim 1, wherein the adhesive strength of the coating to a support body of carbon and/or graphite is higher than the strength of the material of the support body.

8. The support body as claimed in claim 1, wherein the support body comprises carbon and/or graphite, the coating exhibiting a linear thermal expansion change $\leq$0.2% in a Rapoport test if appropriate.

9. The support body as claimed in claim 1, wherein the coating exhibits little or no erosion in the course of a six-hour erosion resistance test in an $Al_2O_3$ slip in accordance with Liao et al., so that a coated sample has an attrition ratio of not more than 1:2 in comparison to an uncoated sample.

10. The support body as claimed in claim 1, which comprises up to 5% by weight of borides, carbides, nitrides and/or silicides of one or more transition metals of groups 4, 5 and/or 6 of the Periodic Table and/or of aluminum.

11. The support body as claimed in claim 1, wherein thickness of the coating is 0.1 mm to 1.0 mm.

12. A support body with a coating comprising at least 95% by weight titanium boride, wherein said coating has an oxygen content of less than or equal to 1% by weight, a metallic impurities content of less than or equal to 0.5% by weight, and a specific electrical resistance or less than or equal to $10\,\mu\Omega\cdot m$ room temperature, and wherein the coating is a spray coating.

* * * * *